Nov. 22, 1955  J. KENNEY, JR  2,724,621
BEARING SUPPORT STRUCTURE
Filed May 26, 1953  2 Sheets-Sheet 1

FIG. I.

INVENTOR
JOSEPH KENNEY JR.
BY
ATTORNEY

Nov. 22, 1955    J. KENNEY, JR    2,724,621
BEARING SUPPORT STRUCTURE
Filed May 26, 1953    2 Sheets-Sheet 2
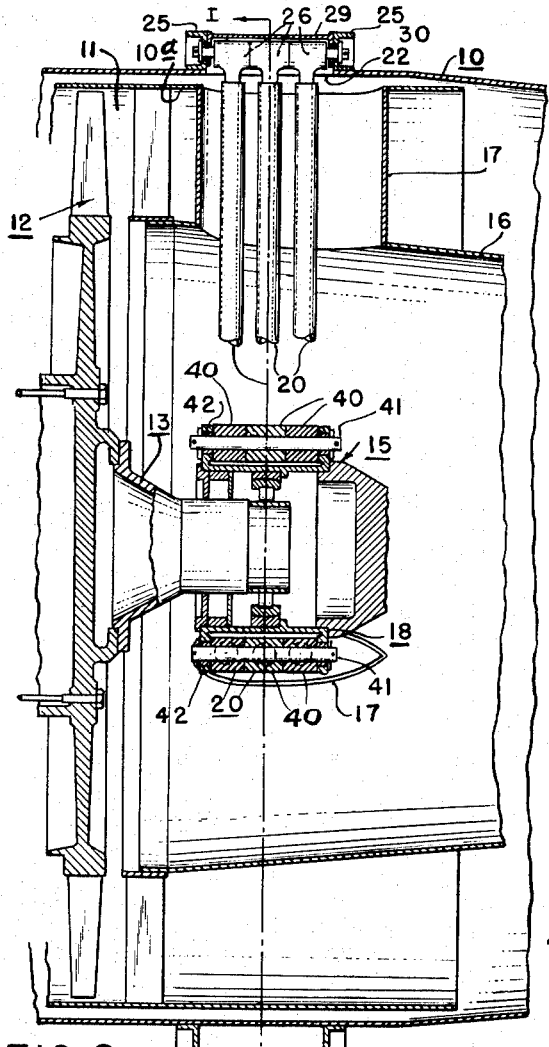
FIG. 2.
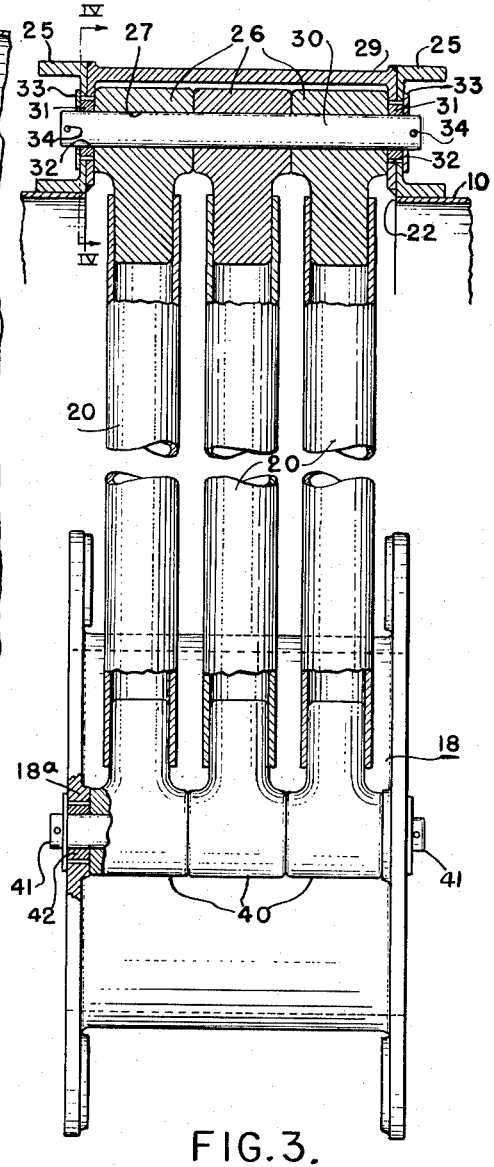
FIG. 3.
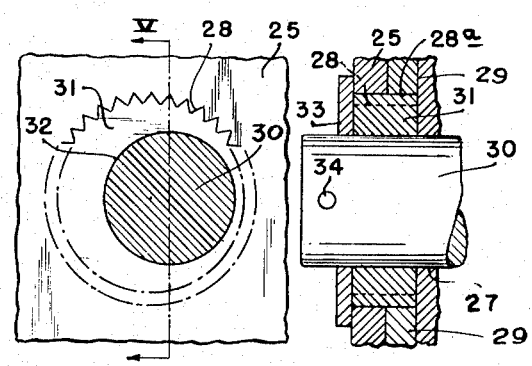
FIG. 4.    FIG. 5.
INVENTOR
JOSEPH KENNEY JR.
BY 
ATTORNEY

United States Patent Office 2,724,621
Patented Nov. 22, 1955

2,724,621

BEARING SUPPORT STRUCTURE

Joseph Kenney, Jr., Collingdale, Pa., assignor to Westinghouse Electric Corporation, East Pittsburgh, Pa., a corporation of Pennsylvania Application May 26, 1953, Serial No. 357,463

3 Claims. (Cl. 308—62)

This invention relates to elastic fluid rotary apparatus, and has for an object the provision of improved bearing supporting structure for a gas turbine or the like.

Another object of the invention is to provide an improved support structure for a bearing that is subject to intense heat, such as the rear bearing of an aviation gas turbine power plant, comprising circumferentially spaced strut members tangentially extending from the bearing housing to an annular outer casing, and readily adjustable securing means for anchoring the ends of the struts without requirement of conventional bolts or unduly tedious aligning of the several components during assembly.

In the patent to George M. Mierley, No. 2,616,662, issued November 4, 1952, and assigned to the assignee of the present invention, tangential strut bearing support means is disclosed, in which the struts terminate in yieldable strap portions carrying bolting elements which are aligned with and bolted to lugs engaging the outer casing. It is another object of the invention to provide an improved bearing support assembly of this character.

In construction of a turbojet bearing strut sub-assembly requiring bolting of the struts to the bearing housing and subsequent machining of the housing and struts as a unit, such sub-assembly must thenceforth retain its identity, and the struts thereof cannot be interchanged with struts from other sub-assemblies, nor even shifted to different relative positions, owing to the difficulty in aligning the bearing housing and support rings of the outer casing. This means that if one strut in such a sub-assembly is distorted or damaged in service, the whole unit must be replaced. Another object of the invention is to provide an improved adjustable bearing support assembly constructed and arranged to obviate the aforesaid difficulty.

In construction of a bearing support strut assembly for an aviation turbojet engine, the machining tolerances required for hole locations in the struts, bearing housing and outer support rings are too exacting to allow economical and practical use of conventional pivot pin connections for the ends of the struts. According to the invention, however, a novel combination of connecting pins and splined eccentric bushings is proposed in order to provide the advantages inherent in a pinned construction, the assembly being adapted for adjustment to vary the effective strut length in increments of a few thousandths of an inch to ensure convenient and accurate alignment of the bearing during assembly.

It is a further object to provide a bearing support assembly of the aforementioned class comprising tangential struts devoid of relatively weak spring portions and having adjustable pinned-end connecting means which are adapted to resist large loads while allowing the desired free rotation and correct alignment of the bearing housing, when thermal expansion occurs.

These and other objects are effected by the invention as will be apparent from the following description taken in connection with the accompanying drawings, forming a part of this application, in which:

Fig. 2 is a fragmentary longitudinal sectional view along the line II—II of Fig. 1, the section line of the latter being indicated at I—I in Fig. 2;

Fig. 3 is an enlarged detail, fragmentary view of the strut elements shown in Fig. 2;

Fig. 4 is an enlarged detail, fragmentary sectional view of one of the pin and eccentric bushing connecting assemblies, taken along the line IV—IV of Fig. 3; and Fig. 5 is a sectional view along the line V—V of Fig. 4.

Figure 1:
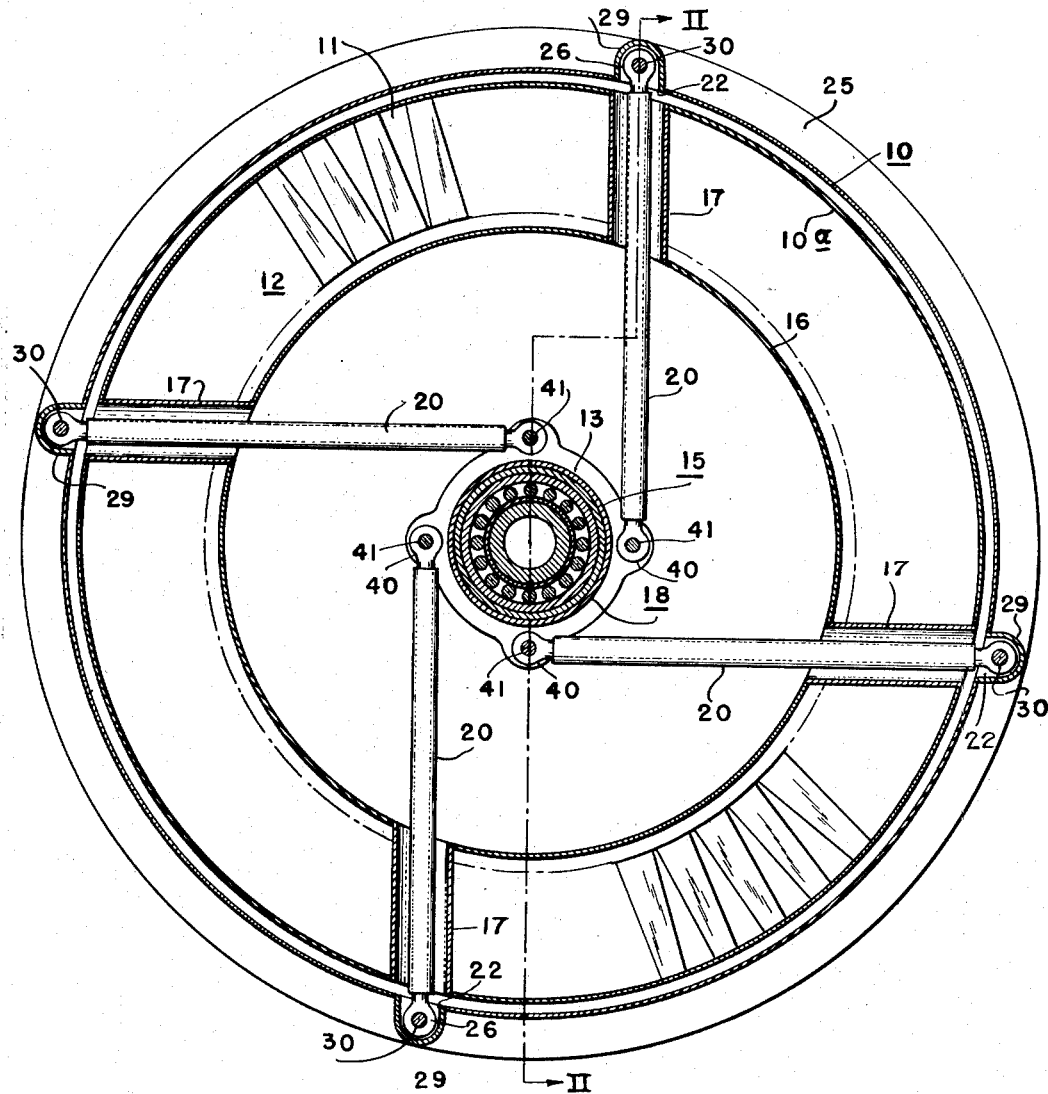
Fig. 1 is a sectional view of the turbine and rear bearing portion of an aviation gas turbine engine, embodying a tangential strut support assembly constructed in accordance with the invention.

A typical gas turbine power plant, of the class with which the improved bearing supporting strut assembly is particularly adapted to be used, is illustrated in the aforementioned patent. Such a power plant comprises a generally cylindrical casing structure 10 having formed therein a longitudinally extending annular passage 11, and housing a compressor and combustion apparatus (not shown) for furnishing hot motive gases through the passage 10 for expansion through a turbine 12, which drives the compressor in the usual well known manner. The rotor 13 of the turbine is journaled in suitable bearings, including a rear bearing assembly 15 disposed on the downstream side thereof and within a tapered fairing section 16 that is supported from an inner section 10a of the casing structure through the medium of outwardly extending tubular members 17.

The bearing assembly 15 includes an annular bearing housing 18 which is supported from the casing structure 10 by means of a plurality of groups of circumferentially spaced outwardly extending strut members 20. In the illustrated form of the invention, each group comprises three parallel strut members 20 of tubular construction, which are aligned within one of the tubular members 17 in a plane parallel to the turbine axis and substantially tangential with relation to the bearing housing 18. Four equally spaced groups of tangentially disposed strut members 20 may be associated with the bearing housing 18, as illustrated in Fig. 1 of the drawings. The number of strut members and the grouping thereof will be a matter of choice, however. The casing structure 10 has suitably spaced openings 22 adjacent the outer ends of the respective groups of strut members 20. A pair of spaced annular supporting members or channel rings 25 are mounted in encompassing relation on the portion of the casing structure 10 surrounding the strut members 20, the outer ends of which carry eye-elements 26 having bores 27 that are adapted to be disposed substantially in registration with corresponding pairs of serrated openings 28 formed in the channel rings, as best shown in Fig. 3. Spanning each opening 22, in the casing structure, a U-shaped end piece 29 having side flanges with serrated openings 28a similar to the openings 28 is secured in bridging relation to the respective channel rings 25.

According to the invention, a pin 30 is mounted in the aligned bores 27 of each group of strut eye-elements 26, and extends through the adjacent serrated openings 28 and 28a of the channel rings and end pieces 29. For adjustably supporting the opposite ends of each pin 30, the serrated openings 28 are fitted with similarly serrated bushings 31 having eccentric openings 32, in which the respective ends of the pin are pivotally engaged (see Fig. 4). It will be understood that accurate centering of the bearing housing carried by the strut members 20 can readily be accomplished by appropriate positioning of these bushings in the serrated openings 28. The outer ends of each pin 30 are provided with suitable washers 33 and transversely inserted retainer pins 34, for holding the assembled components together.

The opposite or inner ends of the strut members 20 may be secured in tangential relation to the bearing housing 18 in any suitable manner. In the preferred embodiment shown, these inner ends of the struts are constructed and arranged to provide the same adjustable eccentric bushing and pin features of the connections already described. Each strut 20 thus carries an eye-piece 40 at its inner end, through which a pin 41 extends for engagement in adjustable eccentric-bore bushings 42 mounted in suitably serrated openings in the side flanges 18a of the bearing housing 18 (see Figs. 1 and 2).

It will now be apparent that, with the bearing support sub-assembly having the adjustable pinned-end strut features just described, the use of spring strut elements is dispensed with, while the bearing housing is maintained freely rotatable to compensate for thermal expansion of the components of the assembly. The serrated bushings and eccentrically mounted pins are readily adjustable, during assembly of the apparatus, to permit accurate alignment of the bearing in the engine casing, so that the strut elements are interchangeable and replaceable, for facilitating the servicing of the engine.

While the invention has been shown in but one form, it will be obvious to those skilled in the art that it is not so limited, but is susceptible of various changes and modifications without departing from the spirit thereof.

What is claimed is:

1. A support assembly for a turbine comprising cylindrical casing structure having an annular motive fluid passage, bearing means disposed coaxially thereof, a plurality of elongated supporting strut members, said strut members being equally spaced circumferentially about said bearing means and diverging tangentially in the same angular direction with respect to the bearing axis, a pair of spaced channel rings encompassing said casing structure, means securing the inner ends of said strut members to said bearing means, eye-pieces carried on the outer ends of said strut members, said channel rings having serrated openings aligned with the respective eye-pieces of said struts, adjustable serrated bushings removably mounted in said serrated openings, respectively, said bushings having eccentric bores, and pins transversely mounted in said eye-pieces and said bores of the corresponding bushings, said bushings being adapted to be variably positioned in said serrated openings to facilitate the alignment of the bearing means relative to said casing structure.

2. Apparatus as set forth in claim 1 wherein the means securing the inner ends of the strut members to the bearing means includes adjustable serrated bushings having eccentric bores and transverse pins similar to those provided for securing the outer ends of the struts.

3. Apparatus as set forth in claim 1 wherein U-shaped end-pieces are mounted to bridge the channel rings adjacent the outer ends of the respective strut members, said end-pieces having serrated openings registering with those in the channel members for receiving the adjustable bushings.

References Cited in the file of this patent

UNITED STATES PATENTS

| | | |
|---|---|---|
| 1,571,557 | Paul | Feb. 2, 1926 |
| 2,616,662 | Mierley | Nov. 4, 1952 |

FOREIGN PATENTS

| | | |
|---|---|---|
| 882,330 | France | Feb. 22, 1943 |